United States Patent [19]

Ishikawa et al.

[11] Patent Number: 4,818,825
[45] Date of Patent: Apr. 4, 1989

[54] INSULATING SPACERS FOR USE IN GAS-INSULATED ELECTRIC APPARATUS

[75] Inventors: Toshio Ishikawa; Tokio Yamagiwa, both of Hitachi, Japan

[73] Assignee: Hitachi, Ltd., Tokyo, Japan

[21] Appl. No.: 118,252

[22] Filed: Nov. 9, 1987

[30] Foreign Application Priority Data

Nov. 11, 1986 [JP] Japan ................................. 61-266670

[51] Int. Cl.[4] ..................... H01B 17/42; H01B 17/18; H02G 5/06
[52] U.S. Cl. ...................................... 174/212; 174/28; 174/99 B
[58] Field of Search ................. 174/16 B, 21 C, 22 C, 174/28, 99 R, 99 B, 99 E, 167, 177, 211, 212; 333/244

[56] References Cited

U.S. PATENT DOCUMENTS

| | | | |
|---|---|---|---|
| 1,736,455 | 11/1929 | Mateer | 174/212 X |
| 3,906,149 | 9/1975 | Hashoff et al. | 174/28 X |
| 4,672,150 | 6/1987 | Yamagiwa et al. | 174/28 X |

FOREIGN PATENT DOCUMENTS

| | | | |
|---|---|---|---|
| 949670 | 9/1956 | Fed. Rep. of Germany | 174/99 B |
| 955792 | 1/1957 | Fed. Rep. of Germany | 174/28 |
| 58-31723 | 3/1983 | Japan | 174/28 |
| 60-24648 | 6/1985 | Japan | 174/28 |
| 60-22743 | 7/1985 | Japan | 174/28 |
| 61-231820 | 10/1986 | Japan | 174/28 |

OTHER PUBLICATIONS

Yu, Cun-Yi et al., "The Influence of Change Accumulation on the Impulse Flashover of Spacers in Compressed SF$_6$", paper presented at the Fourth International Symposium of High Voltage Engineering, Athens, Greece, Sep. 5-9, 1983, 4 pages.

Cooke, C. M. et al., "Post-Type Support Spacers for Compressed Gas-Insulated Cables", IEEE Paper T73121-1, presented at the IEEE PES Winter Meeting, New York, N.Y., Jan. 28-Feb. 2, 1973, pp. 1441-1447.

Primary Examiner—Laramie E. Askin
Attorney, Agent, or Firm—Antonelli, Terry & Wands

[57] ABSTRACT

An insulating spacer for use in a gas-insulated electric apparatus for supporting a high-tension electric conductor inserted through a metallic pipe enclosing an insulating gas, in which the insulating spacer is provided with a plurality of fins on its creeping surface, and in which fin intervals between the metallic pipe and one of the fins adjacent to the metallic pipe, between adjacent ones of the fins, and between the high-tension electric conductor and one of the fins adjacent to the high-tension electric conductor are formed in a manner so that the fin interval formed at a position where a creeping component electric field is high is made narrower than the fin interval formed at a position where a creeping component electric field is lower than that in the first-mentioned position. Thus, the dielectric strength improvement rate becomes larger at a position where the creeping component electric field is higher so that substantially even creeping dielectric strength can be obtained even when an electrically conductive foreign matter adheres wherever on the outside of the insulating spacer.

10 Claims, 8 Drawing Sheets

FIG. 1A   FIG. 1B

PRIOR ART

INSULATING SPACERS FOR USE IN GAS-INSULATED ELECTRIC APPARATUS

BACKGROUND OF THE INVENTION

1. Field of the Invention

The present invention relates to insulating spacers for use in a gas-insulated electrical apparatus, and particularly relates to corrugated insulating spacers suitable for preventing reduction in dielectric strength due to the presence of electrically conductive foreign matters.

2. Description of the Prior Art

Figure 1A:
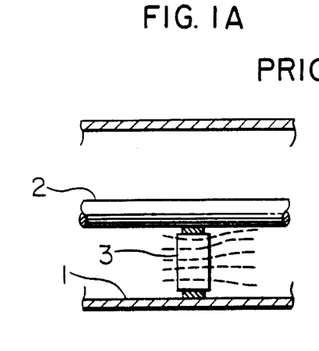
Figure 1B:
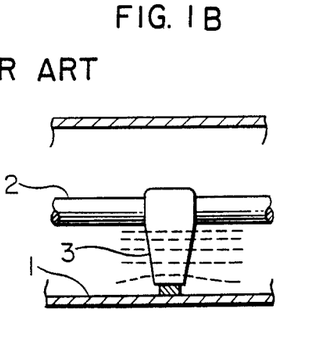
Figure 1C:
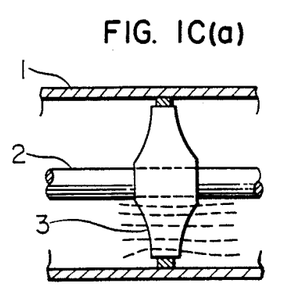
Figure 1D:
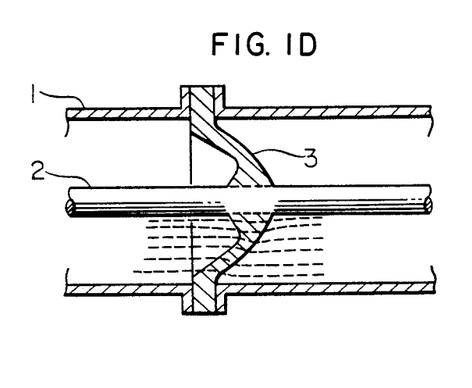
FIG. 1D is a cross section, respectively, showing various examples of the conventional insulating spacer each in the state of use in a gas-insulated electric apparatus.

FIGS. 1A-1D show examples of prior art. In order to support high-tension electric conductors 2 in metallic pipes 1 filled with an insulating gas, generally, insulating spacers 3 having various shapes are used. The examples of the insulating spacers 3 include, for example, such a rod-like insulating spacer 3 having metal fittings at its opposite ends so as to be fixed between a high-tension conductor 2 and a metallic pipe 1 as shown in FIG. 1A, such a rod-like insulating spacer 3 having a metal fitting at its one end to be fixed to an inner wall of a metallic pipe 1 while supporting a high-tension conductor 2 at its other end portion through which the high-tension conductor 2 is passed as shown in FIG. 1B, such a rod-like insulating spacer 3 having metal fittings at its opposite ends to be fixed to an inner wall of a metallic pipe 1 while supporting a high-tension conductor 2 at its center portion through which the high-tension conductor 2 is passed as shown in FIGS. 1C(a) and 1C(b) to thereby stably support the high-tension conductor 2 to the metallic pipe 1, such a circular-conical insulating spacer 3 as shown in FIG. 1D, and so on.

In a gas-insulated electrical apparatus having such arrangements as described above, if electrically conductive foreign matters mix into the metallic pipe 1 and adhere to the insulating spacer 3 supporting the high-tension conductor 2, the creeping dielectric strength of the insulating spacer 3 is lowered substantially, so that the insulating reliability of the gas-insulated electrical apparatus is deteriorated markedly.

To cope with such a situation where electrically conductive foreign matters adhere to the insulating spacer 3, such an insulating spacer having a plurality of fins formed on a surface portion of the insulating spacer between the high-tension conductor 2 and the metallic pipe 1 for suppressing the deterioration in creeping dielectric strength has been proposed, for example, in Japanese Utility Model Publication No. 60-22743, Japanese Utility Model Unexamined Publication Nos. 58-31722, 58-31723, and so on.

In such a conventional insulating spacer, however, there have been problems in that fins are formed on the surface thereof equidistantly or at regular intervals, so that the creeping dielectric strength extremely varies with the position of attachment of the conductive foreign materials, and further in that if the longitudinal axis of the insulating spacer is made longer as the voltage of the gas-insulated electrical apparatus is made higher and higher, the number of the fins increases and the cost of moldings etc. becomes high.

SUMMARY OF THE INVENTION

It is therefore an object of the present invention to solve the problems in the prior art.

It is an object of the present invention to provide an insulating spacer for use in a gas-insulated electric apparatus in which substantially the same dielectric strength can be obtained, even if electrically conductive foreign matters adhere wherever on the insulating spacer.

In order to attain the above objects, according to the present invention, the insulating spacer for use in a gas-insulated electric apparatus is arranged so that the insulating spacer is provided with a plurality of fins on its creeping surface, and that the fin intervals between the metallic pipe and one of the fins adjacent to the metallic pipe, between adjacent ones of the fins, and between the high-tension electric conductor and one of the fins adjacent to the high-tension electric conductor are formed in a manner so that the fin interval formed at a position where a creeping component electric field is high is made narrower than the fin interval formed at a position where a creeping component electric field is lower than that in the first-mentioned position.

In the thus arranged insulating spacer, the dielectric strength improvement rate becomes larger at a position where the creeping component electric field is higher so that substantially even creeping dielectric strength can be obtained even when an electrically conductive foreign matter adheres wherever on the outside of the insulating spacer.

BRIEF DESCRIPTION OF THE DRAWINGS

Above and other objects, features and advantages of the present invention will appear more fully from the following description in conjunction with the accompanying drawings, in which:

FIGS. 1A, 1B and 1C(a) are side views, FIG. 1C(b) is a front view.

DESCRIPTION OF THE PREFERRED EMBODIMENTS

Referring to the drawings, the preferred embodiments of the present invention will be successively described in detail hereunder.

Figure 2:
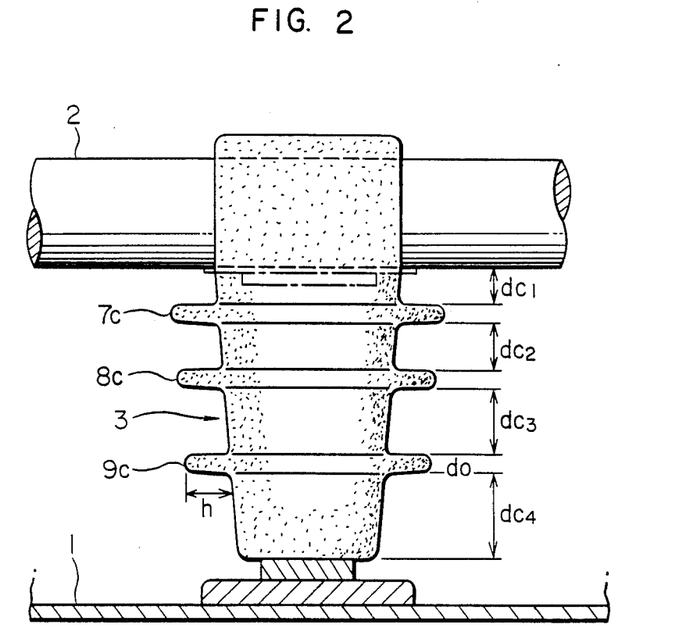
FIG. 2 is a side view of an embodiment of the insulating spacer according to the present invention for use in a gas-insulated electric apparatus.

FIG. 2 shows an embodiment of the present invention applied to a generally rod-like one-leg type insulating spacer 3 having a metal fitting as shown by a one-dot chain line. A high-tension electric conductor 2 inserted into a metallic pipe 1 being maintained at the earth potential and enclosing an insulating gas is supported by the insulating spacer 3 so as to be electrically insulated from the metallic pipe 1. The insulating spacer 3 is provided with a plurality of annular fins $7c$, $8c$, and $9c$ formed on the outer circumference of the insulating spacer 3. The height h and the thickness of each fin are selected to fall within a range of from 5 mm to 30 mm and a range of from 5 mm to 10 mm, respectively.

Fin intervals $dc_1$, $dc_2$, $dc_3$ and $dc_4$ are formed between the high-tension electric conductor 2 and the fin $7c$, between the fins $7c$ and $8c$, between the fins $8c$ and $9c$, and between the fin $9c$ and the end of the insulator body respectively. Each of the fin intervals $dc_1$, $dc_2$, $dc_3$ and $dc_4$ is selected to fall within a range of from 10 mm to 40 mm, and the fin intervals $dc_1$, $dc_2$, $dc_3$ and $dc_4$ are selected to satisfy the relation of $dc_1 < dc_2 < dc_3 < dc_4$. That is, the fins $7c$, $8c$ and $9c$ are arranged so that the fin interval becomes narrower as the fin approaches the high-tension electric conductor 2.

Figure 3A:
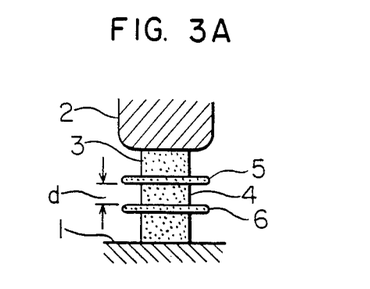
FIGS. 3A and 3B are diagrams for explaining the relation between the fin interval and the rate of improvement in dielectric strength of the insulating spacer.
Figure 3B:
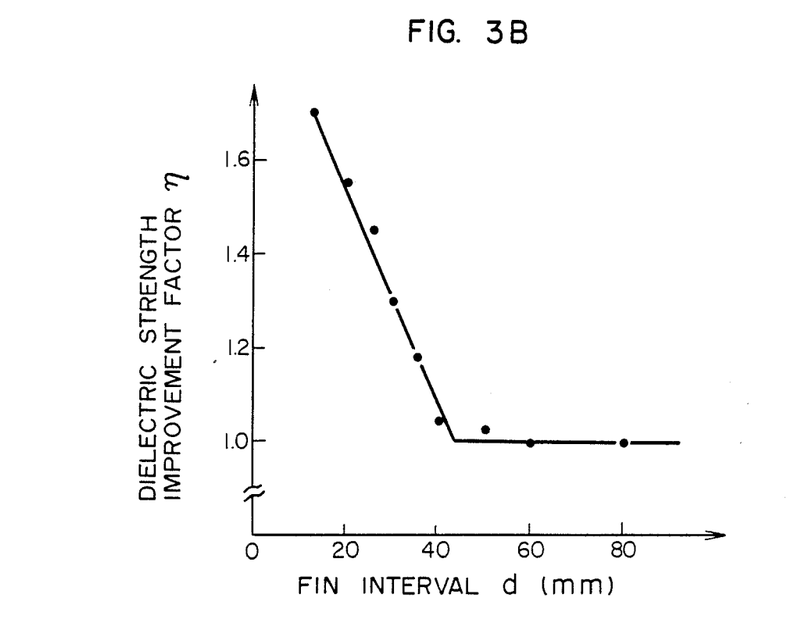

Experiments have proved that the deterioration in dielectric strength of the insulating spacer 3 in the case where an electrically conductive foreign matter 4 adheres on the insulating spacer 3 at a gap between the fins 5 and 6 formed thereon as shown in FIG. 3(A) varies with the value of fin interval d as shown in FIG. 3(B). That is, if the fin interval d is changed in a range of from 10 mm ($10 < d < 40$), dielectric strength improvement rate $\eta$ relative to the flashover voltage in the case of an insulating spacer having no fins can be adjusted within a range of from 1.0 to 1.7 ($1.0 < \eta < 1.7$). Further, from the graph of FIG. 3B, it can be found that even if there are provided the fins 5 and 6, if the fin interval d is selected to be larger than 40 mm, the fins cannot contribute to the dielectric strength improvement rate $\eta$.

Figure 4A:
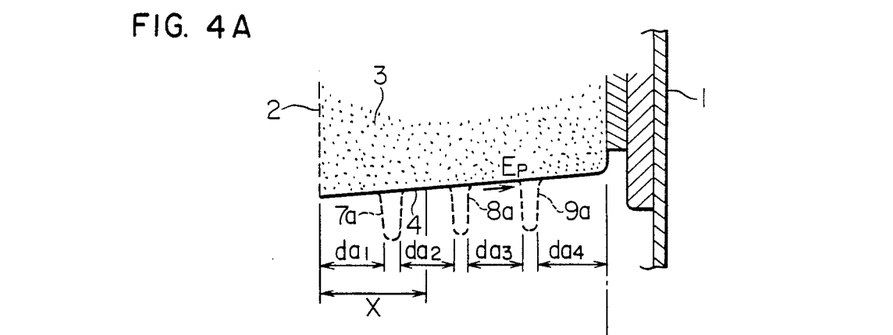
FIGS. 4A, 4B and 4C are diagrams for explaining the relation among the adhering positions of conductive foreign matters on the insulating spacer, the creeping electric field, and the creeping break-down voltage.
Figure 4B:
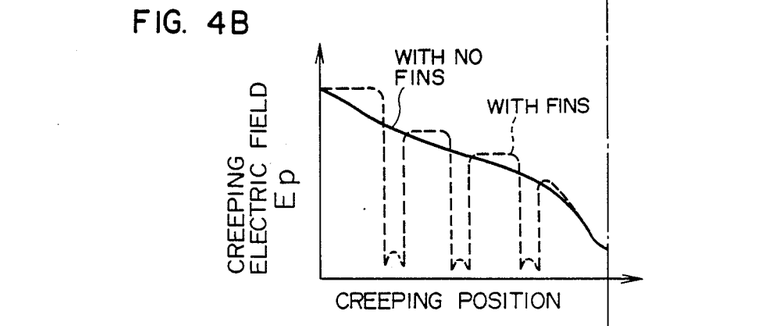
Figure 4C:
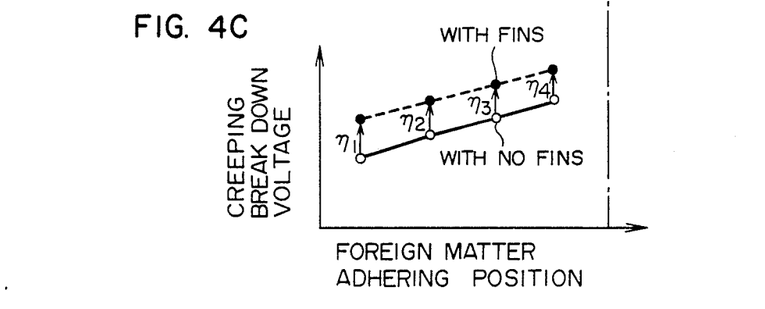

Generally, such conventional insulating spacers 3 having no fins as shown in FIGS. 1A–1D have such a characteristic that the potential allotment on the surface of the insulating spacer 3 becomes higher as a position approaches the high-tension electric conductor 3, so that the creeping component electric field $E_P$ becomes higher as a position approaches the high-tension electric conductor 2 as shown by a solid line in FIG. 4B, and the creeping breakdown voltage in the case where an electrically conductive foreign material has adhered extremely varies with the adhered position X of the foreign matter such that the creeping breakdown voltage becomes lower as the adhered position X approaches the high-tension electric conductor 2 as shown by a solid line in FIG. 4C. Further, even in the case where fins $7a$, $8a$ and $9a$ are formed as shown in FIG. 4A, if the respective fin intervals, $da_1$, $da_2$, $da_3$ and $da_4$ formed by the fins $7a$, $8a$ and $9a$ are made equal to each other as shown by a broken line in FIG. 4A, the creeping breakdown voltage varies with the position X where the foreign matter 4 has adhered, although the improvement rate $\eta$ of the creeping flashover voltage in the case where an electrically conductive foreign matter adhered on the insulating spacer 3 is improved to the values of $\eta_1$, $\eta_2$, $\eta_3$ and $\eta_4$ at respective positions as shown by a broken line in FIG. 4C.

In this embodiment, however, the fin intervals of the insulating spacer 3 are made different from each other as shown in FIG. 2, so that the respective values $\eta_1$, $\eta_2$, $\eta_3$ and $\eta_4$ of the flashover voltage improvement rate $\eta$ are made to satisfy the relation $\eta_1 > \eta_2 > \eta d\,3 > \eta_4$ and the creeping dielectric strength is more strengthened as the adhered position of the foreign matter approaches the high-tension electric conductor 2. This point will be described more in detail with reference to FIGS. 5A–5D and FIG. 6.

Figure 5A:
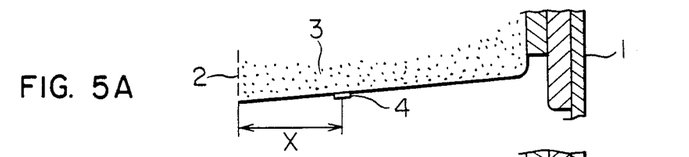
FIGS. 5A-5D and FIG. 6 are diagrams for explaining the relation between the flashover voltage and a variety of insulating spacers.
Figure 5B:
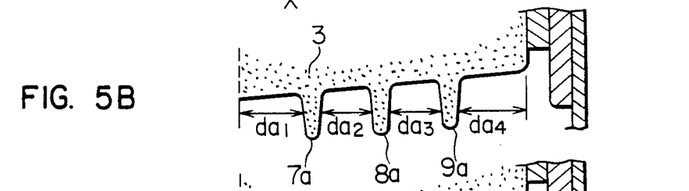
Figure 5C:
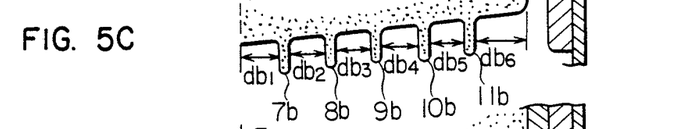
Figure 5D:
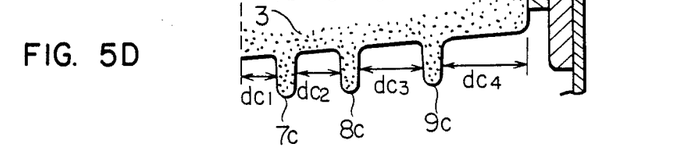

FIG. 5A shows a conventional insulating spacer 3 having no fin; FIG. 5B shows another conventional insulating spacer 3 having three fins $7a$, $8a$ and $9a$ with fin intervals selected to be $da_1 = da_2 = da_3 = da_4$; and FIG. 5C shows another conventional insulating spacer 3 having five fins $7b$, $8b$, $9b$, $10b$ and $11b$ with fin intervals selected to be $db_1 = db_2 = db_3 = db_4 = db_5 = db_6$. On the other hand, FIG. 5D shows the insulating spacer 3 of FIG. 2 having three fins $7c$, $8c$ and $9c$ with fin intervals selected to be smaller as the position approaches the side of the high-tension electric conductor 2 where the creeping component electric field is high.

Figure 6:
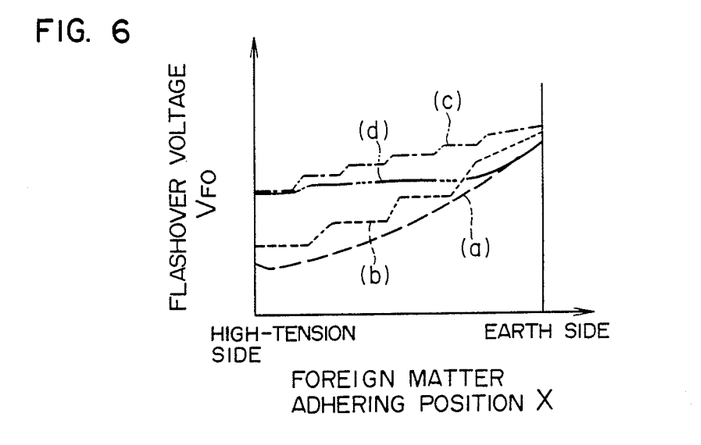

FIG. 6 shows the relation between the position X of the electrically conductive foreign matter 4 and the flashover voltage $V_{FO}$ in each of the insulating spacers 3 shown in FIGS. 5A–5D. The curves (a)–(d) correspond to the respective insulating spacers 3 shown in FIGS. 5A–5D. As clearly seen in FIG. 6, although the dielectric strength of the insulating spacer 3 is made high in each of the cases of FIGS. 5B and 5C where the insulating spacer 3 has equidistantly formed fins compared to the case of FIG. 5A where the insulating spacer 3 has no fins, the flashover voltage $V_{FO}$ varies extremely with the position where the electrically conductive foreign matter 4 adheres. On the contrary, in the case of FIG. 5D where the fin intervals are made different as shown in the drawing, the dielectric strength is made high in the region on the side of the component electric field of high-tension electric conductor where the creeping component electric field is high to the same level as that in the case of FIG. 5C so that the creeping dielectric strength can be made substantially even at any creeping positions as a whole. According to the present invention, therefore, an insulating spacer of excellent performance can be obtained even if the number of fins is small.

Figure 7:
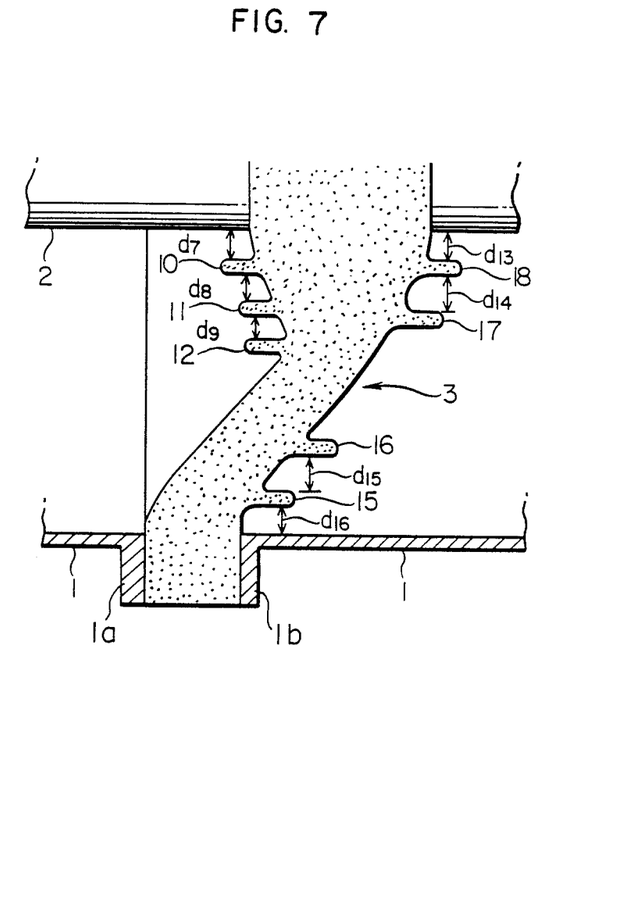
FIG. 7 is a cross section showing another embodiment of the insulating spacer according to the present invention for use in a gas-insulating electric apparatus.

FIG. 7 shows another embodiment of the insulating spacer according to the present invention. The insulating spacer 3 has a well-known generally circularconical shape so as to support a high-tension electric conductor 2 at a central part of the spacer. The insulating spacer 3 is supported by a metallic pipe 1 in such a manner that the outer circumference of the insulating spacer is sandwiched between a pair of flange portions $1a$ and $1b$ of the metallic pipe 1.

In this insulating spacer 3, the creeping component electric field $E_p$ has the highest value at a position a little away from the high-tension electric conductor 2 on the inside surface of the insulating spacer 3 and the next-highest value at positions in the vicinity of the metallic pipe 1 and the high-tension electric conductor 2 respectively on the outside surface of the insulating spacer 3. In view of this point, fins 10, 11 and 12 are annularly formed around the high-tension electric conductor 2 at positions where the creeping component electric field is high on the inside surface of the insulating spacer 3. The fin interval $d_9$ is made narrower than the fin interval $d_8$ between the fins 11 and 12 in pair because the creeping component electric field at the fin interval $d_9$ is higher than at the fin interval $d_8$, and the fin interval $d_7$ between the fin 10 and the high-tension electric conductor 2 is made wider than the fin interval $d_8$. That is, among the fins, the relation $d_7 > d_8 > d_9$ is established. At the inside surface of the insulating spacer 3 between the fin 12 and the metallic pipe 1, the creeping component electric field is low and no fin is formed because even if a fin is formed at this position the fin interval is about 40 mm so that the provision of the fin at this position may have no influence on the dielectric improvement rate η. On the other hand, on the outside surface of the insulating spacer 3, there are provided a pair of annular fins 15 and 16 at positions near the metallic pipe 1 and a pair of annular fins 17 and 18 at positions near the high-tension electric conductor 2. The creeping component electric field on the outside surface of the insulating spacer 3 is high as the position comes close to the high-tension electric conductor 2, and therefore the fin interval $d_{13}$ between the annular fin 18 and the high-tension electric conductor 2 is made narrower than the fin interval $d_{14}$ between the fins 18 and 17. On the other hand, the creeping component electric field on the outside surface of the insulating spacer 3 is high as the position comes close to the metallic pipe 1, and therefore the fin interval $d_{16}$ between the fin 15 and the metallic pipe 1 is made narrower than the fin interval $d_{15}$ between the fins 15 and 16. At the outside surface portion between the fins 16 and 17, although no fins are provided in the illustrated embodiment because the creeping component electric field is low thereat, suitable fins may be formed with fin intervals corresponding to the creeping component electric field at this portion.

As described above, in this embodiment, the fin interval formed at a position where the creeping component electric field is high is made narrower than that formed at any other position where the creeping component electric field is lower than that at the first-mentioned position so that about the same effects are obtained as those in the first-mentioned embodiment even if no fins are formed at a portion where the creeping component electric field is low. As a further embodiment, alternatively, the creeping component electric field on an insulating spacer is divided into a plurality of groups and the fin intervals are made different between the groups so as to make the insulating spacer have stepwise different fin intervals.

Figure 8:
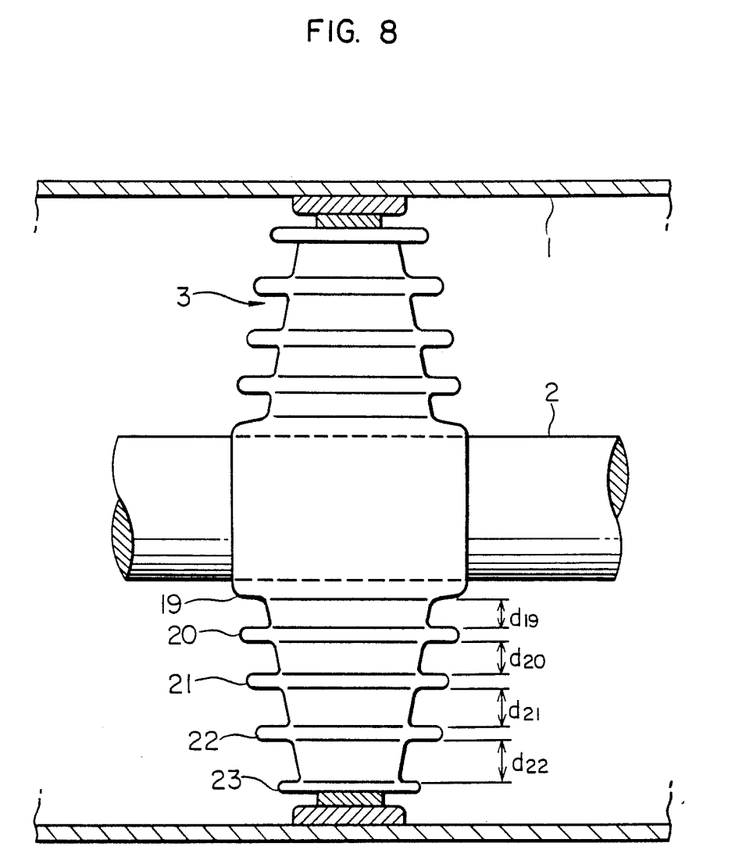
FIG. 8 is a side view showing a further embodiment of the insulating spacer according to the present invention for use in a gas-insulated electric apparatus.

FIG. 8 shows a still further embodiment of the insulating spacer which corresponds to the conventional two-legs type insulating spacer of FIGS. 1C(a) and 1C(b). In such an insulating spacer 3 of this type, the creeping component electric field becomes gradually higher as the position on the insulating spacer 3 comes near the high-tension electric conductor 2 and therefore fins 19-23 are formed such that fin intervals $d_{19}$–$d_{22}$ are selected to satisfy the relation $d_{19}<d_{20}<d_{21}<d_{22}$. In this embodiment, a high dielectric strength insulating spacer with fins is provided because the fins of the insulating spacer 3 include the large fin 19 directly encircling the high-tension electric conductor 2 and the fin 23 formed at the earth-potential side.

As described above in detail, in the insulating spacer according to the present invention, among the fin intervals formed between the fin and the high-tension electric conductor, between the fins, and between the fin and the metallic pipe, the fin interval at a position where the creeping component electric field is high is made narrower than the fin interval formed at a position where the creeping component electric field is low, so that the dielectric strength is substantially even at any position on the insulating spacer wherever an electrically conductive matter adheres on the insulating spacer. Moreover, the dielectric strength can be improved efficiently with a small number of fins to thereby make it possible to reduce the insulating spacer in size as well as in weight.

We claim:

1. An insulating spacer having a plurality of fins for use in a gas-insulated electric apparatus in which a high-tension electric conductor inserted through a metallic pipe enclosing an insulating gas is to be supported by said insulating spacer, the improvement in that fin intervals between the end of the insulating spacer which is to be positioned adjacent to said metallic pipe and the fin adjacent thereto, between adjacent ones of said fins, and between the part of the insulating spacer which is to contact said high-tension electric conductor and the fin adjacent thereto are formed in a manner so that one of said fin intervals formed at a position where a creeping component electric field is high is made narrower than another one of said fin intervals formed at a position where a creeping component electric field is lower than that in the first-mentioned position, and in which said fins are formed only at positions on said insulating spacer where the creeping electric field is high, and one of said fin intervals formed at a portion where a creeping component electric field is high is made narrower than another one of said fin intervals formed at a portion where the creeping component electric field is lower than that in the first-mentioned portion.

2. An insulating spacer having a plurality of fins for use in a gas-insulated electric apparatus in which a high-tension electric conductor inserted through a metallic pipe enclosing an insulating gas is to be supported by said insulating spacer, the improvement in that fin intervals between the end of the insulating spacer which is to be positioned adjacent to said metallic pipe and the fin adjacent thereto, between adjacent ones of said fins, and between the part of the insulating spacer which is to contact said high-tension electric conductor and the fin adjacent thereto are formed in a manner so that one of said fin intervals formed at a position where a creeping component electric field is high is made narrower than another one of said fin intervals formed at a position where creeping component electric field is lower than that in the first-mentioned position, and in that a height of each of said fins is selected to fall within a range of from 5 mm to 30 mm and each of said fin intervals is selected to fall within a range of from 10 mm to 40 mm.

3. An insulating spacer having a plurality of fins for use in a gas-insulated electric apparatus according to claim 2, in which said fins are formed only at positions on said insulating spacer where the creeping electric field is high, and one of said fin intervals formed at a portion where creeping component electric field is high is made narrower than another one of said fin intervals formed at a portion where the creeping component electric field is lower than that in the first-mentioned portion.

4. An insulating spacer having a plurality of fins for use in a gas-insulated electric apparatus according to claim 2, in which said fins are formed in a manner so that said fin intervals are made gradually wider from a position where the creeping component electric field is higher toward a position where the creeping component electric field is lower.

5. An insulating spacer having a plurality of fins for use in a gas-insulated electric apparatus according to claim 2, in which said fins are formed in a manner so that said fin intervals are made stepwise wider from a position where the creeping component electric field is higher toward a position where the creeping component electric field is lower.

6. An insulating spacer having a plurality of fins for use in a gas-insulated electric apparatus in which a high-tension electric conductor inserted through a metallic pipe enclosing an insulating gas is to be supported by said insulating spacer, the improvement in that said insulating spacer is rod-like formed so as to support said high-tension electric conductor at its one end and so as to be supported by said metallic pipe at its other end, and in that fin intervals between the end of the insulating spacer which is to be positioned adjacent to said metallic pipe and the fin adjacent thereto, and between the part of the insulating spacer which is to contact said high-tension electric conductor and the fin adjacent thereto are formed in a manner so that one of said fin intervals formed on the high-tension electric conductor side is made narrower than another one of said fin intervals formed on the metallic pipe side, and in which said fins are formed only at positions on said insulating spacer where the creeping electric field is high, and one of said fin intervals formed at a portion where a creeping component electric field is high is made narrower than another one of said fin intervals formed at a portion where the creeping component electric field is lower than that in the first-mentioned portion.

7. An insulating spacer having a plurality of fins for use in a gas-insulated electric apparatus in which a high-tension electric conductor inserted through a metallic pipe enclosing an insulating gas is to be supported by said insulating spacer, the improvement in that said insulating spacer is conically formed so as to support said high-tension electric conductor at its center portion and so as to be supported by said metallic pipe by being sandwiched at its outer circumferential portion between flange portions of said metallic pipe, and in that fin intervals between the end of the insulating spacer which is to be positioned adjacent to said metallic pipe and the fin adjacent thereto, between adjacent ones of said fins, and between the part of the insulating spacer which is to contact said high-tension electric conductor and the fin adjacent thereto are formed in a manner so that one of said fin intervals formed at a position where a creeping component electric field is high is made narrower than another one of said fin intervals formed at a position where a creeping component electric field is lower than that in the first-mentioned position.

8. An insulating spacer having a plurality of fins for use in a gas-insulated electric apparatus according to claim 7, in which said fins are formed only at positions on said insulating spacer where the creeping electric field is high, and one of said fin intervals formed at a portion where a creeping component electric field is high is made narrower than another one of said fin intervals formed at a portion where the creeping component electric field is lower than that in the first-mentioned portion.

9. An insulating spacer having a plurality of fins for use in a gas-insulated electric apparatus according to claim 7, in which said fins are formed in a manner so that said fin intervals are made gradually wider from a position where the creeping component electric field is higher toward a position where the creeping component electric field is lower.

10. An insulating spacer having a plurality of fins for use in a gas-insulated electric apparatus according to claim 7, in which said fins are formed in a manner so that said fin intervals are made stepwise wider from a position where the creeping component electric field is higher toward a position where the creeping component electric field is lower.

* * * * *